United States Patent [19]

Takeda et al.

[11] Patent Number: 4,869,854

[45] Date of Patent: Sep. 26, 1989

[54] PROCESS FOR MANUFACTURING ORGANIC SILAZANE POLYMERS AND CERAMICS THEREFROM

[75] Inventors: Yoshihumi Takeda; Minoru Takamizawa; Akira Hayashida, all of Niigata, Japan

[73] Assignee: Shin-Etsu Chemical Co., Ltd., Tokyo, Japan

[21] Appl. No.: 114,111

[22] Filed: Oct. 27, 1987

[30] Foreign Application Priority Data

Oct. 31, 1986 [JP] Japan .................................. 61-261634
Feb. 5, 1987 [JP] Japan .................................. 62-25786

[51] Int. Cl.$^4$ .................... D01F 9/10; D01F 11/04; C04B 35/56; C04B 35/58

[52] U.S. Cl. ........................ 264/22; 264/29.1; 264/29.2; 264/29.6; 264/56; 264/65; 264/82; 264/83; 264/85; 264/101; 264/210.4; 264/210.6; 264/210.8; 264/211; 264/211.15; 264/211.18; 501/92; 501/95; 501/97; 528/14; 528/21; 528/31; 528/32; 528/34; 528/35; 528/39

[58] Field of Search .................... 264/56, 65, 82, 83, 264/22, 60, 211, 222.11, 211.14, 236, 347, 29.1, 29.2, 29.6, 85, 101, 210.4, 210.8, 210.6, 211.15, 211.18; 501/95, 97, 92; 528/31, 34, 36, 32, 87, 43, 14, 21, 35, 39

[56] References Cited

U.S. PATENT DOCUMENTS

| | | | |
|---|---|---|---|
| 3,853,567 | 12/1974 | Verbeek .................................. | 501/90 |
| 3,892,583 | 7/1975 | Winter et al. ............................ | 501/92 |
| 4,097,294 | 6/1978 | Rice et al. ................................ | 264/65 |
| 4,255,549 | 3/1981 | Christphlienk et al. ............... | 528/28 |
| 4,312,970 | 1/1982 | Gaul, Jr. .................................. | 538/32 |
| 4,340,619 | 7/1982 | Gaul, Jr. .................................. | 264/29.2 |
| 4,395,460 | 7/1983 | Gaul ........................................ | 264/29.2 |
| 4,482,669 | 11/1984 | Seyferth et al. ........................ | 528/28 |
| 4,482,689 | 11/1984 | Haluska .................................. | 264/29.5 |
| 4,535,007 | 8/1985 | Cannady ................................. | 264/29.5 |
| 4,543,344 | 9/1985 | Cannady ................................. | 264/63 |
| 4,577,039 | 3/1986 | Arkles ..................................... | 556/409 |
| 4,595,775 | 6/1988 | Arkles ..................................... | 556/409 |
| 4,656,300 | 4/1987 | Lebrun et al. .......................... | 423/324 |
| 4,659,850 | 4/1987 | Arai et al. ............................... | 528/28 |
| 4,689,252 | 8/1987 | Lebrun et al. .......................... | 501/92 |
| 4,694,060 | 9/1987 | Porte et al. .............................. | 528/28 |
| 4,705,037 | 11/1987 | Seyferth et al. ........................ | 501/90 |
| 4,720,532 | 1/1988 | Seyferth et al. ........................ | 501/97 |
| 4,722,988 | 2/1988 | Porte et al. .............................. | 528/28 |
| 4,730,026 | 3/1988 | Bolt et al. ................................ | 528/25 |
| 4,771,118 | 9/1988 | Takamizawa et al. ................. | 528/14 |

FOREIGN PATENT DOCUMENTS 228489 11/1985 Japan .

OTHER PUBLICATIONS

Zhdanov et al., "Catalytic Polycondensation of Organosilazanes", Polymer Science, U.S.S.R., vo. 23, No. 6, pp. 1429-1438 (1981).

Andrianov, et al, "Reactions of Organocyclosilazanes with Electrophilic and Nucleophilic Reagents", Jour. of Organometallic Chem. 3, (1965), pp. 129-137.

Andrianov et al, "Reaction of α,ω-Dihydromethylsilazanes with Nucleophilic Reagents", M. V. Lomonosov Moscow Inst. of Fine Chem. Techn., Transl. from Doklady Akademii Nauk SSSR, Vol. 176, No. 1, pp. 85-88, Sep. 1967.

Andrianov et al, "Synthesis of Isotopically Substituted Organosilazanes and Some Features of Their IR Spectra", M. V. Lomonosov Moscow Inst. of Fine Chemical Techn., Transl. from Zhurnal Obashchei Akademii, vol. 49, No. 12, pp. 2683-2689, Dec. 1979.

Primary Examiner—Hubert Lorin
Attorney, Agent, or Firm—Jules E. Goldberg

[57] ABSTRACT

A process for manufacturing an organic silazane polymer which comprises reacting ammonia with a mixture of at least one compound selected from the group consisting of organic silicon compounds of the following formulae (I) and (II)

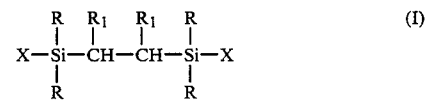

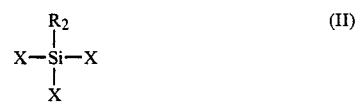

and at least one compound selected from the group consisting of organic silicon compounds of the following formula (III)

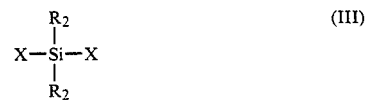

in which R represents hydrogen, chlorine, bromine, methyl radical, ethyl radical, phenyl radical or vinyl radical, $R_1$ represents hydrogen or methyl radical, $R_2$ represents hydrogen, methyl radical, ethyl radical, phenyl radical or vinyl radical and X represents chlorine or bromine; to obtain an ammonolysis product. The ammonolysis product is polymerized in the presence of a basic catalyst capable of deprotonation to obtain an organic silazane polymer. The silazane polymer may be further melted, shaped and infusibilized. The thus infusibilized product is finally sintered to obtain a ceramic material.

23 Claims, No Drawings

PROCESS FOR MANUFACTURING ORGANIC SILAZANE POLYMERS AND CERAMICS THEREFROM

BACKGROUND OF THE INVENTION

1. Field of the Invention

This invention relates to a process for manufacturing organic silazane polymers which are suitably used as preceramic materials and also to a process for manufacturing ceramics from the organic silazane polymers.

2. Description of the Prior Art

Great interest has been currently shown in ceramics as materials which have good properties such as heat resistance, abrasion resistance, high-temperature strength and the like. However, because of the hardness and brittleness, ceramics are very difficult to process. For the manufacture of shaped ceramic articles, it is accordingly general to use a method which comprises molding a fine powder of ceramic material into a desired form such as by compression and sintering the molded article, or a precursor method in which an organic polymer, serving as a preceramic material, is melted or dissolved in a solvent, followed by processing the melted or dissolved polymer into a desired form and sintering it to render the polymer inorganic. The prominent feature of the precursor method resides in that ceramic products of such complex forms as will never be obtained in the sintering method for fine powder can be obtained, i.e. products of specific forms such as fibers or sheets can be manufactured.

Among ceramics, SiC and $Si_3N_4$ have attracted generally considerable attention because of the good characteristic properties thereof at high temperatures, e.g. SiC has a high heat resistance and a high-temperature strength and $Si_3N_4$ has a high thermal shock resistance and a high fracture toughness. Accordingly, there have been made various proposals on processes of producing SiC-$Si_3N_4$ ceramics and also on processes of producing organic silicon precursors according to the precursor method as is particularly shown (1) to (5) below. However, these proposed processes have still problems set forth below.

(1) In U.S. Pat. No. 3,853,567, there is disclosed a process of obtaining SiC-$Si_3N_4$ ceramics in which chlorosilanes and amines are reacted and subsequently heated at high temperatures to obtain carbosilazanes, followed by subjecting the carbosilazanes to spinning and infusibilization and then sintering at high temperatures of from 800° to 2000° C. However, this process requires high temperatures of 520° to 650° C. in order to obtain the carbosilazane, thus being very difficult to apply as an industrial process. In addition, the carbosilazanes are disadvantageous in that the yield of ceramic materials therefrom is as low as about 55%. As will be apparent from examples of this U.S. Patent specification, the chlorosilanes used are only methyltrichlorosilane and dimethyldichlorosilane and the amine is methylamine alone.

(2) U.S. Pat. No. 4,097,294 describes convention of various silicon-containing polymers into ceramic materials by pyrolysis. Only one silazane polymer is set forth in this patent and the ceramic yield is as low as 12% in a maximum. Although this United States patent specification describes that ceramic materials may be formed into fibers or thin films, the formation is merely suggested as possible. In fact, there is made little or no reference to moldability and processability of polymers which are considered to be most important in the precursor method.

(3) There is known production of silazane polymers, for example, by reaction between chlorodisilanes and disilazanes in U.S. Pat. No. 4,340,619, by reaction between chlorosilanes and disilazanes in U.S. Pat. No. 4,312,970, by reaction between chlorodisilanes and ammonia in U.S. Pat. No. 4,395,460, and by reaction between trichlorosilane and disilazanes in U.S. Pat. No. 4,543,344. Moreover, silazane polymers are prepared by addition of metal halides to chlorosilanes and disilazanes as disclosed in U.S. Pat. No. 4,535,007 and by addition of metal halides to chlorodisilanes and disilazanes as disclosed in U.S. Pat. No. 4,482,689. It is stated in these references that all the silazane polymers mentioned above may be converted to ceramic materials by pyrolysis. However, the ceramic yields of all the silazane polymers are, at most, 50 to 60 wt %. Similar to the U.S. Pat. No. 4,097,294, all the above references do not describe in detail moldability and processability of the polymers. which are most important in the precursor method. In particular, most references do not make mention of ceramic fibers in examples, or do not refer to strength of ceramic fibers in case where examples of ceramic fibers are shown. Only in U.S. Pat. No. 4,482,689, there is a description of strength, but ceramic fibers having such a low tensile strength as of 53 $kg/mm^2$ or 63 $kg/mm^2$ are obtained.

(4) In U.S. Pat. No. 4,482,669, there is described a process of preparing silazane polymers which comprises reacting ammonia with an organic silicon compound of the formula,

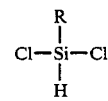

to obtain an ammonolysis product and subjecting the product to condensation by dehydrogenation with alkali metal or alkaline earth metal hydrides to obtain silazane polymers. It is stated that the polymers obtained in this process can be controlled in property depending on the degree of condensation by deprotonation and may take various forms of from oils to solids having no definite melting points. However, when a polymer melt is molded or processed to prepare, for example, a continuous fiber by melt spinning, it is necessary that the polymer have a certain degree of polymerization and be thermally stable. In the above process, the polymer obtained will be in the form of a solid which has not a melting point unless the polymerization is stopped on its way. In order to obtain a fusible polymer, the reaction time, reaction temperature, amounts of a catalyst and a solvent have to be controlled precisely but such a control may be very difficult and may not be usually reproducible. The polymers obtained by the process are not thermally stable with the disadvantage that gel-like substances are formed. In view of the above two problems, this process may not be always considered to be suitable as an industrial process of manufacturing silazane polymers.

(5) Japanese Laid-open Patent Application No. 60-228489 describes a process of preparing a silazane polymer which comprises producing cyclic silazane from a compound of the formula,

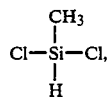

and monomethylamine, followed reacting the cyclic silazane with ammonia. In this patent application, it is stated that the polymer is suitable as a material for chemical vapor deposition, but physical properties of the polymer are not described in detail. The ceramic yield is not indicated at all.

As will be apparent from the foregoing description, hitherto proposed silazane polymers, serving as preceramic materials, are not always beneficial for industrial production. In addition, these polymers were found to be poor with respect to moldability and processability into ceramic fibers and the like with a poor ceramic yield. Ceramic products, e.g. ceramic fibers, obtained from the known preceramic polysilazane materials were found to have relatively poor physical properties such as strength, modulus of elasticity and the like.

SUMMARY OF THE INVENTION

It is therefore an object of the present invention to provide a process for manufacturing preceramic materials which is adapted for industrial production and which enables one to produce the preceramic materials having good moldability and processability in high ceramic yield.

It is another object of the invention to provide a process for manufacturing ceramics of high quality from the preceramic polymer materials.

In order to develop a process of manufacturing ceramic products which may belong to the art of a precursor method and also a process of manufacturing preceramic polymer materials which are suitable for the manufacture of the ceramic products and have good moldability and processability, our attention has been drawn to SiC-Si$_3$N$_4$ ceramics which have good hightemperature characteristics of both SiC and Si$_3$N$_4$. Accordingly, intensive studies have been made on the manufacture of SiC-Si$_3$N$_4$ ceramics according to a precursor method. As a result, it has been found that silazane polymers having good thermal stability and a controlled degree of polymerization can be obtained by mixing at least one compound selected from the group consisting of organic silicon compounds of the following formulae (I) and (II)

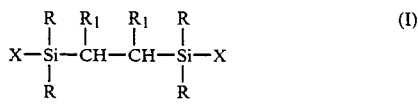

in which R represents hydrogen, chlorine, bromine, methyl radical, ethyl radical, phenyl radical or vinyl radical, R$_1$ represents hydrogen or methyl radical, R$_2$ represents hydrogen, methyl radical, ethyl radical, phenyl radical or vinyl radical and X represents chlorine or bromine; and at least one compound selected from the group consisting of organic silicon compounds of the following formula (III)

in which R$_2$ and X have the same meaning as defined above, reacting the mixture with ammonia to obtain an ammonolysis product, subjecting the ammonolysis product to condensation by dehydrogenation with a catalyst capable of deprotonation such as, for example, an alkali metal or alkaline earth metal hydride, and completing the condensation reaction. When the silazane polymers are melted, molded, heated in air or irradiated with an electron beam or an ultraviolet beam for infusibilization, and sintered, ceramics of high quality composed predominantly of SiC and Si$_3$N$_4$ can be obtained. The present invention is accomplished based on the above findings.

According to one embodiment of the present invention, there is provided a process for manufacturing organic silazane polymers which comprises reacting a mixture of at least one selected from the organic silicon compounds of the formulae (I) and (II) and at least one selected from the organic silicon compounds of the formula (III) with ammonia to obtain an ammonolysis product, and polymerizing the ammonolysis product in the presence of a basic catalyst capable of deprotonation. The present invention also provides an organic silazane polymer obtained by the above process.

According to another embodiment of the invention, there is provided a process for manufacturing ceramics which comprises reacting a mixture of at least one selected from the organic silicon compounds of the formulae (I) and (II) and at least one selected from the organic silicon compounds of the formula (III) with ammonia to obtain an ammonolysis product, polymerizing the ammonolysis product in the presence of a basic catalyst capable of deprotonation to obtain an organic silazane polymer, melting, molding and infusibilizing the organic silazane polymer, and sintering the infusibilized polymer to obtain a ceramic material. There is also provided a ceramic material composed of SiC-Si$_3$N$_4$ obtained by the above process.

The process of manufacturing organic silazane polymers according to the invention can give an organic silazane polymer of high quality having good moldability, processability and infusibility in a high ceramic yield of, for example, 70 to 80%. This process does not require a precise or minute control of reaction time, reaction temperature, and amounts of catalyst and solvent and does not require troublesome operations of stopping the polymerization on its way, thus ensuring industrial and easy manufacture of the silazane polymer.

The present inventors have already proposed a process for manufacturing organic silazane polymers wherein three compounds of methyldichlorosilane, dimethyldichlorosilane and methyltrichlorosilane are used (the U.S. patent application Ser. No. 903,409). In comparison with the above proposed process of Ser. No. 903,409 the process of the present invention can provide various polymers having different compositions because of the use of the organic silicon compound of the formula (I) as a starting material.

The process of manufacturing ceramics according to the invention uses the thus obtained various organic silazane polymers as a precursor or preceramic material. Therefore, ceramic products of a desired form having excellent physical properties can be readily obtained by the present invention.

It will be noted that the use of chlorosilanes as a starting material for preparing silazane polymers or preceramic materials is conventionally known as set forth before. However, it has never been known heretofore that the afore-indicated organic silicon compounds of the formulae (I), (II), and (III) are selectively used in combination among a number of organic silicon compounds and that after ammonolysis of the mixture, the resulting product is subjected to condensation by dehydrogenation in the presence of a specific type of catalyst to obtain silazane polymers having such good characteristics as will never be experienced in prior art. This is the first finding by us.

The mixture used in the practice of the invention is a combination of at least one selected from the organic silicon compounds of the formulae (I) and (II) and at least one selected from the organic silicon compounds of the formula (III). Preferably, the mixture is composed of 0 to 30 mole % of the compound (I), 0 to 30 mole % of compound (II) and 40 to 85 mole % of the compound (III). In this case, $R_2$ in the organic silicon compounds (II) and (III) is preferably composed of 55 to 90 mole % of hydrogen, 0 to 30 mole % of vinyl radical and 0 to 30 mole % of alkyl or phenyl radical. The silazane polymers obtained from the above combination of the specific starting materials have chemical structures different from a silazane polymer obtained from methyldichlorosilane alone as set forth in U.S. Pat. No. 4,482,669. More particularly, the silazane polymers obtained according to the invention comprise different types of repeating units in various bridges of these repeating units in the structure.

According to the preferred embodiment of the present invention, the compound of the formula (I), methyltrichlorosilane as the compound of the formula (II) and methyldichlorosilane as the compound of the formula (III) are combined in a preferred molar ratio of 2 to 30 mole % (the compound (I)), 5 to 30 mole % (methyltrichlorosilane) and 55 to 90 mole % (methyldichlorosilane), thereby obtaining a polysilazane which can be converted to a ceramic mainly composed of SiC and $Si_3N_4$ by melting, molding, infusibilizing and sintering.

The silazane polymer according to the present invention has the novel structure different from the known silazane polymer structure and has the characteristic properties. Since such a polysilazane is used as the preceramic material, the ceramic yield is remarkably improved over the yield of known processes of manufacturing ceramics according to the precursor method. Moreover, the resultant ceramics have greatly improved physical properties such as tensile strength, modulus of elasticity and the like.

The above and other objects, features and advantages will be more apparent from the following descriptions.

DETAILED DESCRIPTION AND EMBODIMENTS OF THE INVENTION

As set forth, the mixture of at least one compound selected from the group consisting of organic silicon compounds of the following formulae (I) and (II)

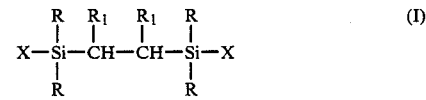

in which R represents hydrogen, chlorine, bromine, methyl radical, ethyl radical, phenyl radical or vinyl radical,
$R_1$ represents hydrogen or methyl radical, $R_2$ represents hydrogen, methyl radical, ethyl radical, phenyl radical or vinyl radical and X represents chlorine or bromine; and at least one compound selected from the group consisting of organic silicon compounds of the following formula (III)

in which $R_2$ represents hydrogen, methyl radical, ethyl radical, phenyl radical or vinyl radical and X represents chlorine or bromine is used as the starting materials for preparing organic silazane polymers according to the invention. In this case, the mixture is preferably composed of 0 to 30 mole % of the compound (I), 0 to 30 mole % of the compound (II) and 40 to 85 mole % of the compound (III). More preferably, the mixture may be composed of 1 to 25 mole % of the compound (I), 1 to 25 mole % of the compound (II) and 50 to 80 mole % of the compound (III). Outside the above compositional ranges, the resulting polymers may become oily or may have a high melting point over 300° C. and is incapable melting, thus being unfavorable.

In case of preparing the mixture having the abovedefined mixing ratio, $R_2$ in the organic silicon compounds (II) and (III) is preferably composed of 55 to 90 mole % of hydrogen, 0 to 30 mole % of vinyl radical and 0 to 30 mole % of alkyl or phenyl radical, more preferably composed of 55 to 80 mole % of hydrogen, 0 to 25 mole % of vinyl radical and 0 to 25 mole % of alkyl or phenyl radical by selecting the variety of the compounds (II) and (III). the compounds (II) and (III) are used so that $R_2$ is composed of 55 to 80 mole % of hydrogen, 0 to 30 mole % of vinyl radical and 0 to 30 mole % of alkyl or phenyl radical the resultant polysilazane or the preceramic material is excellent in infusibility upon preparing ceramics, thereby improving a ceramic yield. On the other hand, if the compounds (II) and (III) are used out of the above-defined range, the resultant polysilazane is difficult or unable to infusibilize, and therefore a ceramic product having a desired shape may not be obtained.

In the present invention, the compound (I) includes 1,2-bis(chlorodimethylsilyl) ethane, 1,2-bis(dichloromethylsilyl) ethane and 1,2-bis(trichlorosilyl) ethane. They may be used singly or in combination. The compound (II) includes methyltrichlorosilane trichlorosilane, vinyltrichlorosilane. The compound (III) includes methyldichlorosilane, dimethyldichlorosilane, methylvinyldichlorosilane, vinyldichlorosilane.

As the mixture which is a starting material for preparing organic silazane polymers according to the present invention, the mixture of methyldichlorosilane, methyltrichlorosilane and the organic silicon compound of the formula (I) is preferably used. In this case, the mixture has preferably a composition of 55 to 90 mole % of methyldichlorosilane, from 5 to 30 mole % of methyltrichlorosilane, and from 2 to 30 mole % of the organic silicon compound of the formula (I). Outside the above compositional ranges, the resulting polymers may become oily or may have a high melting point over 300° C. and is incapable of melting, thus being unfavorable.

The preparation of an ammonolysis product from the mixture of the above organic silicon compounds is not critical with respect to the procedure. For instance, there is conveniently used a process in which the mixture is reacted with gaseous $NH_3$ in organic solvents and, after removal of the ammonium chloride by-product, the organic solvent is stripped off.

In a subsequent step, the ammonolysis product is polymerized in the presence of a basic catalyst capable of deprotonation. Preferably, the ammonolysis product is subjected to condensation by dehydrogenation with the catalyst in solvent to complete the reaction. The basic catalyst capable of deprotonation includes alkali metal or alkaline earth metal hydrides or metal amides such as KH, NaH, $NaNH_2$, $KNH_2$ and the like. The solvents used in the polymerization step may be ethers such as tetrahydrofuran dialkyl ethers and the like, aliphatic hydrocarbons such as pentane, hexane and the like, and aromatic hydrocarbons such as benzene, toluene, xylene and the like. Although the polymerization may usually be effected at normal temperatures, the polymerization temperature should be appropriately selected from a range of 0° to 200° C., depending on the type of solvent.

After completion of the condensation by dehydrogenation, the remaining basic catalyst species is preferably decomposed with a electrophilic compound such as methyl iodide. The resulting insoluble matter is removed by filtration and the solvent is distilled off under reduced pressure. As a result, a silazane polymer having a melting point of from 60° to 200° C. and a molecular weight of from 800 to 3000 (cryoscopic method using benzene) is obtained. The completion of the condensation reaction can be confirmed by stop of gas evolution.

The degree of polymerization and melting point of the silazane polymer can be suitably controlled by changing the mixing ratios of the above organic silicon compounds.

The organic silazane polymers obtained in this manner have high moldability and processability and can be shaped, as preceramic materials, into suitable forms such as, for example, fibers or sheets. In addition, the polymers may be used as binders or adhesives.

In the process of manufacturing ceramics according to the invention, the organic silazane polymers are melted, shaped or molded, infusibilized and finally sintered. For this purpose, the polymer should preferably have a melting point of 60° to 200° C. and a molecular weight of 800 to 3000 (cryoscopic method using benzene) or an intrinsic viscosity of 0.06 to 0.09 as determined in benzene solution at 20° C. because such polymers permit easy melting and shaping.

The manners of melting, shaping and sintering of the organic silazane polymers are not critical. The polymers are shaped or molded as desired and sintered to obtain ceramic products of desired forms composed of $SiC$-$Si_3N_4$.

For instance, when ceramic fibers are fabricated, the organic silazane polymer is heated to melt and spun by melt spinning. The spinning temperature may vary depending on the melting point of the polymer, and is favorably in the range of from 100° to 300° C.

Next, the thread-like material is infusibilized by heating in air or infusibilized by irradiation with an electron beam in vacuum or in an inert gas such as $N_2$ gas or with an ultraviolet beam in an atmosphere such as an inert gas including $N_2$, Ar etc. In this step, the heating in air is preferably effected at a temperature of from 50° to 150° C. The electron beam irradiation is preferably at an exposed dose of from 10 to 2000 Mrad. The ultraviolet irradiation may be carried out by using a commercially available ultraviolet lump having a wave length of 250 to 400 nm. The light volume of the ultraviolet can be adjusted by selecting the intensity of the light source, the irradiating distance and the irradiating time depending on the infusible property of the organic silazane polymer used. The organic silazane polymers suitably infusibilized by the ultraviolet irradiation is those obtained by using the compound (II) and/or the compound (III) having a comparatively large amount of vinyl radical as the substituent radical $R_2$. However, the organic silazane polymer having a small amount of vinyl radical can also be effectively infusibilized by the ultraviolet irradiation if photosensitizer and/or vulcanizer is added to the organic silazane polymer. The blending amount of photosensitizer and/or vulcanizer may preferably be 0.0001 to 5% by weight of the polymer from the viewpoint of the influence to the resulting ceramic product. The known photosensitizer and vulcanizer may be used. Examples of the photosensitizer include benzophenone, acetophenone and rosebengal. Examples of the vulcanizer include diphenyl disulfide, 1,3-benzenedithiol and 2,2'-dithiobis(benzothiazole),2-mercaptoethylsulfide. They are used singly or in combination.

The thus infusibilized thread-like material is sintered at high temperatures in a tension-free or tensioned condition, thereby obtaining ceramic fibers composed mainly of $SiC$ and $Si_3N_4$ and having good strength and modulus of elasticity. The sintering is preferably effected in vacuum or in an atmosphere of one or more gases, such as an inert gas including Ar, etc., $N_2$, $H_2$, $NH_3$ and the like, at a temperature of from 700° to 2000° C., preferably from 700° to 1500° C. The sintering under tension is more preferable, by which there can be obtained ceramic fibers of high quality having a tensile strength of from 200 to 310 kg/mm$^2$ and a modulus of elasticity of from 15 to 30 tons/mm$^2$.

In the sintering, the organic silazane polymer is added as a binding agent in one or more kinds of powder of an inorganic compound selected from the group consisting of alumina, silicon carbide, silicon nitride and boron nitride, whereby easily obtaining a ceramic molding product of high quality.

As will be apparent from the foregoing, the organic silazane polymers can be conveniently produced according to the process of the invention. The silazane polymers are thermally stable and have a desired degree of polymerization with good moldability and processability. The polymers can be manufactured in high ceramic yield because of the excellent infusibility and thus, are very suitable for use as preceramic materials for ceramic fibers.

On the other hand, according to the process of manufacturing ceramics of the invention, ceramics of high quality composed mainly of SiC and $Si_3N_4$ can be obtained in high ceramic yield from the organic silazane polymer. Ceramic products of desired forms such as ceramic fibers, ceramic sheets and ceramic molding product having high infusibility, high strength and high modulus of elasticity can be obtained easily.

In addition, according to the present invention, various polysilazanes can be obtained because of the use of the organic silicon compound of the formula (I) as the starting material.

The present invention is more particularly described by way of examples and comparative examples. The examples should not be construed as limiting the present invention.

[Example 1]

Ammonolysis step (1) using
methyldichlorosilane:methyltrichlorosilane:1,2-bis(methyldichlorosilyl)ethane =75:10:15 (mole %):

A dried, one liter four-necked flask equipped with an agitator, a thermometer, an $NH_3$ gas inlet tube and dryice-methanol cooler was charged with 850 ml of hexane, to which 43.1 g of methyldichlorosilane, 7.5 g of methyltrichlorosilane and 19.2 g of 1,2-bis(methyldichlorosilyl) ethane were added, followed by cooling down to $-20°$ C. An excess of gaseous ammonia was added to the solution at a rate of 45 liters/hour for 1.5 hours (a total amount of added $NH_3$ of 3.0 mols). The reaction mixture was heated to room temperature, whereupon a cooling device was changed to an air-cooling condenser in order to purge excess $NH_3$. Thereafter, byproduct ammonium chloride was removed from the reaction mixture by filtration in a dry box. The resulting filter cake was washed with 200 ml of hexane. The hexane was stripped off from the filtrate under a reduced pressure of 1 mmHg/60° C. The residue (ammonolysis product) was a transparent fluid liquid and was obtained in an amount of 31 g.

Ammonolysis step (2) using
methyldichlorosilane:methyltrichlorosilane:
1,2-bis(methyldichlorosilyl) ethane=65:25:10 (mole %)
:

850 ml of hexane was charged into a one liter four-necked flask having the same equipment as used above, to which 37.4 g of methyldichlorosilane, 18.6 g of methyltrichlorosilane and 12.8 g of 1,2-bis(methyldichlorosilyl) ethane were added, followed by cooling down to $-20°$ C. Gaseous ammonia was added to the solution at a rate of 45 liters/hour for 1.5 hours. Thereafter, the procedure of the ammonolysis step (1) was repeated, thereby obtaining 30 g of a transparent, fluid liquid (ammonolysis product).

Ammonolysis step (3) using
methyldichlorosilane:methyltrichlorosilane:
1,2-bis(trichlorosilyl) ethane=75:15:10 (mole %) :

A 2 liter four-necked flask having the same equipment as used above was charged with 1500 ml of dehydrated hexane, to which 69.0 g of methyldichlorosilane, 17.9 g of methyltrichlorosilane and 23.8 g of 1,2-bis(trichlorosilyl) ethane were added, followed by reaction with gaseous ammonia in the same manner as described above. Subsequently, the above procedure of (1) was repeated, thereby obtaining 48 g of a transparent, fluid liquid (ammonolysis product).

POLYMERIZATION STEP (1):

A 300 ml three-necked flask was equipped with an agitator, a thermometer and a dropping funnel, into which 0.2 g (5 mmols) of potassium hydride (KH) and 125 ml of tetrahydrofran (THF) dehydrated with NaH were charged in a dry box. The flask was removed from the dry box and connected to $N_2$ gas streamed tube. While the mixture was agitated at room temperatures to disperse KH, 10 g of the product obtained in the ammonolysis step (1) and dissolved in 75 ml of THF was gradually added from dropping funnel in 15 minutes. During the addition, gases were evolved in large amounts and 1 hour after the addition, the gas evolution was ceased. When 3 g of methyl iodide was added, a white precipitate of KI was formed. After further agitation for 30 minutes, most THF solvent was removed under reduced pressure and 80 ml of hexane was added to the residue. The mixture was filtered and the filtrate was subjected to removal of hexane under a reduced pressure (1 mmHg) at 70° C., thereby obtaining 9.1 g of a viscous solid (silazane polymer). This product had an intrinsic viscosity of 0.06 (benzene, 20° C.) and a melting point of 90° C. and was soluble in organic solvents such as hexane, benzene, THF and the like. The IR analysis revealed absorptions of NH at 3400 $cm^{-1}$, C-H at 2980 $cm^{-1}$, Si-H at 2150 $cm^{-1}$, and Si-$CH_3$ at 1260 $cm^{-1}$. The molecular weight by cryoscopic method using benzene was 820.

POLYMERIZATION STEP (2)

10 g of the ammonolysis product obtained in the ammonolysis step (2) was reacted with 0.2 g of KH in THF for 90 minutes in the same manner as in the polymerization step (1). After the gas evolution was ceased, $CH_3I$ was added, followed by repeating the procedure of the polymerization step (1), thereby obtaining 9.3 g of a viscous solid (silazane polymer). The polymer had an intrinsic viscosity of 0.08 and a melting point of 120° C.

POLYMERIZATION STEP (3)

10 g of the ammonolysis product obtained in the ammonolysis step (3) was reacted with 0.2 g of KH in THF for 90 minutes in the same manner as in the polymerization step (1). After the gas evolution was ceased, $CH_3I$ was added, followed by repeating the procedure of the polymerization step (1), thereby obtaining 9.1 g of a viscous solid (silazane polymer). The polymer had an intrinsic viscosity of 0.07 and a melting point of 115° C.

FIBER PREPARATION STEP (1)

30 g of the silazane polymer obtained in the polymerization step (1) was melt spun at 130° C. by the use of a mono-hole melt spinning apparatus. The melt spinning was carried out very smoothly even after 4 hours and was performed at a take-up speed of 400 m/minute. The resulting green thread was subjected to infusibilization treatment by election beam irradiation at 120 Mrad. Thereafter, the thread was sintered under a slight tension in a stream of $N_2$ at a heat-up rate of 100° C./hour at 1100° C. for 30 minutes.

The ceramic yield was 75%. The resulting fiber has a diameter of 6 micrometers, a tensile strength of 230 kg/$mm^2$ and a modulus of elasticity of 22 tons/$mm^2$. The elementary analysis of the fiber revealed that the fiber contained 58.6% of Si, 19.0% of C, 20.4% of N and 2% of O, and was mainly composed of SiC-Si$_3$N$_4$.

FIBER PREPARATION STEP (2)

10 g of the silazane polymer obtained in the polymerization step (2) was spun at 160° C. by the use of such a melt spinning apparatus as used in fiber preparation step (1). The spinning was carried out very smoothly at a take-up speed 420 m/minute. The resultant green thread was thermally infusibilized under a light tension in air at 90° to 110° C. (5° C./hour). Thereafter, the thread was sintered in a tension-free condition in a stream of N$_2$ at a heat-up speed of 100° C./hour at 1200° C. for 30 minutes. The ceramic yield was found to be 80% and the resulting fiber had a diameter of 8 micrometers, a tensile strength of 200 kg/mm$^2$ and a modulus of elasticity of 17 tons/mm$^2$. The elementary analysis of the fiber revealed that the fiber contained 55.6 % of Si, 17.8 % of C, 17.4 % of N and 9.2 % of O, and was mainly composed of SiC-Si$_3$N$_4$.

FIBER PREPARATION STEP (3)

20 g of the silazane polymer obtained in the polymerization step (3) was spun in a dry box by the use of such a melt spinning apparatus as used in fiber preparation step (1) at 150° C. at a take-up speed of 450 m/minute. The spinning was smoothly continued. The resulting green thread was subjected to infusibilization in vacuum by irradiation of 90 Mrad. by the use of an electron beam generator. Thereafter, the resulting fiber was sintered under tension in a steam of N$_2$ at 1250° C. (100° C./hour) for 30 minutes. The ceramic yield was found to be 77%. The fiber had a diameter of 6 micrometers, a tensile strength of 250 kg/mm$^2$ and a modulus of elasticity of 23 tons/mm$^2$.

[Example II]

Ammonolysis step (4) using methyldichlorosilane:1,2-bis(methyldichlorosilyl) ethane:methyltrichlorosilane=70:10:20 (mole %):

A dried, one liter four-necked flask equipped with an agitator, a thermometer, an NH$_3$ gas inlet tube and dryice-methanol cooler was charged with 800 ml of hexane, to which 40.3 g of methyldichlorosilane, 12.8 g of 1,2-bis-(methyldichlorosilyl) ethane and 12.9 g of methyltrichlorosilane were added, followed by cooling down to −20° C. An excess of gaseous ammonia was added to the solution at a rate of 50 liters/hour for 1.5 hours. The reaction mixture was heated to room temperature, whereupon a cooling device was changed to an air-cooling condenser in order to purge excess NH$_3$. Thereafter, by product ammonium chloride was removed from the reaction mixture by filtration in a dry box. The resulting filter cake was washed twice with 200 ml of hexane. The hexane was stripped off from the filtrate under a reduced pressure of 1 mmHg/60° C. The residue (ammonolysis product) was a transparent fluid liquid and was obtained in an amount of 33 g.

Ammonolysis step (5) using methyldichlorosilane:1,2-bis(methyldichlorosilyl) ethane:vinyltrichlorosilane=65:10:25 (mole %):

800 ml of hexane was charged into a one liter four-necked flask having the same equipment as used above, to which 37.4 g of methyldichlorosilane, 12.8 g of 1,2-bis-(methyldichlorosilyl) ethane and 17.6 g of vinyltrichlorosilane were added, followed by cooling down to −20° C. Gaseous ammonia was added to the solution at a rate of 45 liters/hour for 1.5 hours. Thereafter, the procedure of the ammonolysis step (4) was repeated, thereby obtaining 30 g of a transparent, fluid liquid (ammonolysis product).

Ammonolysis step (6) using methyldichlorosilane:1,2-bis(trichlorosilyl) ethane:methylvinyldichlorosilane=55:25:20 (mole %):

A 2 liter four-necked flask having the same equipment as used above was charged with 1500 ml of dehydrated hexane, to which 56.9 g of methyldichlorosilane, 66.8 g of 1,2-bis(trichlorosilyl) ethane and 25.4 g of methylvinyl- dichlorosilane were added, followed by reaction with gaseous ammonia in the same manner as described above. Subsequently, the above procedure of the ammonolysis step (4) was repeated, thereby obtaining 67 g of a transparent, fluid liquid (ammonolysis product).

POLYMERIZATION STEP (4)

A 300 ml three-necked flask was equipped with an agitator, a thermometer and a dropping funnel, into which 0.2 g (5 mmols) of KH and 125 ml of THF dehydrated with NaH were charged in a dry box. The flask was removed from the dry box and connected to N$_2$ gas streamed tube. While the mixture was agitated at room temperatures to disperse KH, 10 g of the product obtained in the ammonolysis step (4) and dissolved in 75 ml of THF was gradually added from dropping funnel in 15 minutes. During the addition, gases were evolved in large amounts and 1 hour after the addition, the gas evolution was ceased. When 3 g of methyl iodide was added, a white precipitate of KI was formed. After further agitation for 30 minutes, most THF solvent was removed under reduced pressure and 80 ml of hexane was added to the residue. The mixture was filtered and the filtrate was subjected to removal of hexane under a reduced pressure (1 mmHg) at 70° C., thereby obtaining 9.3 g of a viscous solid (silazane polymer). This product had a molecular weight of 1050 (cryoscopic method using benzene) and a melting point of 96° C. and was soluble in organic solvents such as hexane, benzene, THF and the like. The IR analysis revealed absorptions of NH at 3400 cm$^{-1}$, C-H at 2980 cm$^{-1}$, Si-H at 2150 cm$^{-1}$, and Si-CH$_3$ at 1260 cm$^{-1}$.

POLYMERIZATION STEP (5)

10 g of the ammonolysis product obtained in the ammonolysis step (5) was reacted with 0.2 g of KH in THF for 90 minutes in the same manner as in the polymerization step (4). After the gas evolution was ceased, CH$_3$I was added, followed by repeating the procedure of the polymerization step (4), thereby obtaining 9.0 g of a viscous solid (silazane polymer). The polymer had a molecular weight of 1120 and a melting point of 102° C.

POLYMERIZATION STEP (6)

10 g of the ammonolysis product obtained in the amnonolysis step (6) was reacted with 0.2 g of KH in THF for 90 minutes in the same manner as in the polymerization step (4). After the gas evolution was ceased, CH$_3$I was added, followed by repeating the procedure of the polymerization step (4), thereby obtaining 9.1 g of a viscous solid (silazane polymer). The polymer had a molecular weight of 1250 and a melting point of 121° C.

FIBER PREPARATION STEP (4)

30 g of the silazane polymer obtained in the polymerization step (4) was melt spun at 160° C. by the use of a mono-hole melt spinning apparatus. The melt spinning was carried out very smoothly even after 4 hours and was performed at a take-up speed of 400 m/minute. The resulting green thread was subjected to infusibilization treatment by electron beam irradiation at 120 Mrad. Thereafter, the thread was sintered under a slight tension in a stream of $N_2$ at a heat-up rate of 100° C./hour at 1100° C. for 30 minutes.

The ceramic yield was 70 %. The resulting fiber has a diameter of 6 micrometers, a tensile strength of 240 kg/mm$^2$ and a modulus of elasticity of 21 tons/mm$^2$. The elementary analysis of the fiber revealed that the fiber contained 58.3 % of Si, 19.3 % of C, 22.2 % of N and 2% of O, and was mainly composed of $SiC-Si_3N_4$.

FIBER PREPARATION STEP (5)

10 g of the silazane polymer obtained in the polymerization step (5) was spun at 170° C. by the use of such a melt spinning apparatus as used in fiber preparation step (4). The spinning was carried out very smoothly at a take-up speed of 420 m/minute. The resultant green thread was thermally infusibilized under light tension in air at 80° to 105° C. (5° C./hour). Thereafter, the thread was sintered in a tension-free condition in a stream of $N_2$ at a heat-up speed of 100° C./hour at 1200° C. for 30 minutes. The ceramic yield was found to be 80% and the resulting fiber had a diameter of 8 micrometers, a tensile strength of 230 kg/mm$^2$ and a modulus of elasticity of 17 tons/mm$^2$. The elementary analysis of the fiber revealed that the fiber contained 55.6% of Si, 17.8% of C, 17.4% of N and 9.2% of O, and was mainly composed of $SiC-Si_3N_4$.

FIBER PREPARATION STEP (6)

20 g of the silazane polymer obtained in the polymerization step (6) was spun in a dry box by the use of such a melt spinning apparatus as used in fiber preparation step (4) at 180° C. at a take-up speed of 450 m/minute. The spinning was smoothly continued. The resulting green thread was subjected to infusibilization in vacuum by irradiation of 100 Mrad. by the use of an electron beam generator. Thereafter, the resulting fiber was sintered under tension in a stream of $N_2$ at 1250° C. (100° C./hour) for 30 minutes. The ceramic yield was found to be 77%. The fiber had a diameter of 6 micrometers, a tensile strength of 250 kg/mm$^2$ and a modulus of elasticity of 23 tons/mm$^2$.

FIBER PREPARATION STEP (7)

15 g of the silazane polymer obtained in the polymerization step (5) was melt spun in a dry box at 130° C. by the use of such a melt spinning apparatus as used in fiber preparation step (4). The resulting green thread was subjected to infusibilization treatment in a stream of $N_2$ by ultraviolet beam irradiation at a distance of 15 cm for 30 minutes. Thereafter, the thread was sintered under tension in a stream of $N_2$ at 1100° C. (100° C./hour) for 30 minutes.

The ceramic yield was 73 %. The resulting fiber had a diameter of 11 micrometers, a tensile strength of 280 kg/mm$^2$ and a modulus of elasticity of 22 tons/mm$^2$.

FIBER PREPARATION STEP (8)

The silazane polymer obtained in the polymerization step (6) was mixed with 0.2% of rosebengal as a photosensitizer and was spun by the use of such a melt spinning apparatus as used in fiber preparation step (4). The resultant green thread was sintered by ultraviolet beam irradiation in the same manner as in fiber preparation step (7). The ceramic yield was 76 % and the resulting fiber had a diameter of 10 micrometers, a tensile strength of 300 kg/mm$^2$ and a modulus of elasticity of 25 tons/mm$^2$.

FIBER PREPARATION STEP (9)

10 g of the silazane polymer obtained in the polymerization step (5) was added to 0.01% of benzophenone and 0.2% of 1,3-benzeneditiole as an intensifying agent of light and mixed with 50 ml of hexane. Thereafter, the hexane was distilled off under reduced pressure. The above mixed polymer was melt spun by the use of such a melt spinning apparatus as used in fiber preparation step (1). The resulting green thread was subjected to infusibilization by ultraviolet beam irradiation in the same manner as in fiber preparation step (7). Thereafter, the resulting fiber was sintered. The ceramic yield was 76%, and the fiber had a diameter of 8 micrometers, a tensile strength of 300 kg/mm$^2$ and a modulus of elasticity of 26 tons/mm$^2$.

PROCESS FOR MANUFACTURING CERAMIC MOLDS 0.5 g of the silazane polymer obtained in the polymerization step (6) was added to 10 g of fine powder of SiC and 2 g of hexane and was mixed and dispersed. Thereafter the hexane was distilled off to obtain a powder mixture. The powder mixture was press molded under the molding pressure of 1000 kg/cm$^2$, thereby obtaining a powder-pressed molding having a diameter of 25 mm and a thickness of 10 mm. Thereafter, the powder-pressed molding was put in an atmosphere of argon and heated up from the room temperature to 1000° C. for 2 hours and from 1000° C. to 1950° C. for 1 hour. The molding was kept in 1950° C. for 30 minutes, followed by cooling down. The resulting molding had a density of 2.8 g/cm$^3$ and a bending strength of 28 kg/mm$^2$.

[COMPARATIVE EXAMPLE]

Ammonolysis step

A one liter four-necked flask equipped with an agitator, a thermometer, an $NH_3$ gas inlet tube and a dryice-methanol cooler was charged with 850 ml of dehydrated hexane, to which 46 g of methyldichlorosilane was added. Gaseous ammonia was introduced into the solution for reaction at a rate of 12 liters/hour for 3.5 hours. Thereafter, the ammonolysis step (1) of Example was repeated, thereby obtaining 20 g (85 %) of a transparent fluid liquid.

POLYMERIZATION STEP

After charging 0.2 g of KH and 125 mi of THF into a 300 ml three-necked flask and agitating to disperse KH in THF, a mixture of 75 ml of THF and 10 g or the transparent fluid liquid obtained above was dropped into the dispersion from a dropping funnel at room temperatures in 15 minutes. Agitation was continued for thirty minutes after completion of the dropping, and then 2 g of $CH_3I$ was added to stop the reaction on its way. Subsequently, the procedure of the polymerization step (1) of Example was repeated, thereby obtaining 9.0 g of a viscous solid. This solid material had an molecular weight of 870 (cryoscopic method using benzene) and a melting point of 75° C. The polymerization in this system was controlled with respect to the temperature, amount of the catalyst, and polymerization time in order to keep a constant degree of polymerization. However, reproducible results could not be obtained.

Fiber preparation step 8 g of the resulting silazane polymer was charged into a mono-hole (nozzle diameter 0.5 mm) melt spinning apparatus and melt spun at 110° C. Initially discharge from the nozzle was good and the spinning was possible. Thirty minutes after commencement, discharge from the nozzle stopped. Although the temperature gradually increased, no discharge took place. After cooling, the polymer was removed and its melting point was measured. As a result, it was found that the polymer did not melt even at 300° C. and was insoluble in various solvents. The green thread initially obtained was subjected to irradiation with an electron beam at 90 Mrad., followed by sintering in a stream of $N_2$ at a heat-up speed of 100° C./hour at 1100° C. for 30 minutes. The ceramic yield was found to be 58%. The resulting fiber had a diameter of 7 micrometers, a tensile strength of 50 kg/mm$^2$ and a modulus of elasticity of 5 tons/mm$^2$, thus being poorer than in the case of the invention.

What is claimed is:

1. A process for manufacturing an organic silazane polymer which comprises reacting ammonia with a mixture consisting of at least one compound selected from the group consisting of organic silicon compounds of the formula (I);

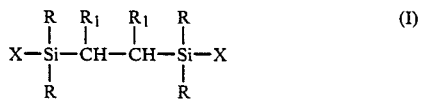

at least one compound selected from the group consisting of organic silicon compounds of the following formula (II).

and at least one compound selected from the group consisting of organic silicon compounds of the following formula (III)

in which $R_1$ represents hydrogen, chlorine, bromine, methyl radical, ethyl radical, phenyl radical or vinyl radical;

$R_1$ represents hydrogen or methyl radical, $R_2$ represents hydrogen, methly radical, ethyl radical, phenyl radical, or vinyl radical and X represents chlorine or bromine, to obtain an ammonolysis product, the mixing ratios of the organic silicon compounds shown by the above formulae II), (II), and (III) being in ranges of 1 to 25 mole %, 1 to 25 mole %, and 50 to 80 mole %, respectively, and polymerizing the ammonolysis product in the presence of a basic catalyst capable of deprotonation to obtain an organic silazane polymer.

2. A process according to claim 1, wherein the amounts of hydrogen, vinyl radical and alkyl or phenyl radical in $R_2$ of the organic silicon compounds of the formulae (II) and (III) are in ranges of 55 to 90 mole %, 0 to 30 mole % and 0 to 30 mole %, respectively.

3. A process according to claim 1, which comprises reacting ammonia with a mixture of the compound of the formula (I), methyltrichlorosilane as the compound of the formula (II) and methyldichlorosilane as the compound of the formula (III) to obtain an ammonolysis product, and polymerizing the ammonolysis product in the presence of a basic catalyst capable of deprotonation to obtain an organic silazane polymer.

4. A process according to claim 1, wherein the organic silicon compound of the formula (I) is 1,2-bis-(chlorodimethylsilyl) ethane.

5. A process according to claim 1, wherein the organic silicon compound of the formula (I) is 1,2-bis-(dichloromethylsilyl) ethane.

6. A process according to claim 1, wherein the organic silicon compound of the formula (I) is 1,2-bis-(trichlorosilyl) ethane.

7. A process according to claim 1, wherein said basic catalyst is selected from the group consisting or KH, NaH, NaNH$_2$ and KNH$_2$.

8. A method for forming a ceramic fiber comprising heating a silazane polymer obtained by the process of claim 1 to melt it, melt spinning the molten polymer into a fiber at a spinning temperature of from 100 to 300° C., infusibilizing the fiber, and then sintering the infusibilized fiber.

9. The method of claim 8 wherein the sintering is carried out under tension

10. A process for manufacturing a ceramic product which comprises reacting ammonia with a mixture consisting of at least one compound selected from the group consisting of organic silicon compounds of the formula (I);

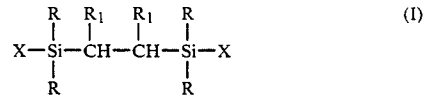

at least one compound selected from the group consisting of organic silicon compounds of the following formula (II;;

and at least one compound selected from the group consisting of organic silicon compounds of the following formula (II)

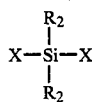

(III)

in which
- R represents hydrogen, chlorine, bromine, methyl radical, ethyl radical, phenyl radical or vinyl radical,
- $R_1$ represents hydrogen, or methyl radical,
- $R_2$ represents hydrogen, methyl radical, ethyl radical, phenyl radical or vinyl radical and
- X represents chlorine or bromine; to obtain an ammonolysis product, the mixing ratios of the organic silicon compounds shown by the above formulae (I), (II), and (III) being in the ranges of I to 25 mole %, 1 to 25 mole % and 50 to 80 mole %, respectively.

polymerizing the ammonolysis product in the presence of a basic catalyst capable of deprotonation to obtain an organic silazane polymer, melting, molding and infusibilizing the silazane polymer, and sintering the resulting polymer to obtain a ceramic material.

11. The process of claim 10 wherein the compound of formula (II) is methyltrichlorosilane and the compound of formula (III) is methyldichlorosilane 12. A process according to claim 10, wherein the amounts of hydrogen, vinyl radical and alkyl or phenyl radical in $R_2$ of the organic silicon compounds of the formulae (II) and (III) are in ranges of 55 to 90 mole %, 0 to 30 mole % and 0 to 30 mole %, respectively.

13. A process according to claim 0, wherein said organic silazane polymer has a melting point of 60° to 200° C.

14. A process according to claim 10, wherein said organic silazane polymer is melted, molded and infusibilized in air at a temperature of from 50° to 150° C.

15. A process according to claim 10, wherein said organic silicon polymer is melted, molded and infusibilized in vacuum or in $N_2$ gas by irradiation of an ultraviolet beam at an exposed dose of from 10 to 2000 mrad.

16. A process according to claim 10, wherein said organic silazane polymer is melted, molded and infusibilized in an inert atmosphere by irradiation of an ultraviolet beam.

17. A process according to claim 16, wherein an photosensitizer is added to said organic silazane polymer before irradiation of an ultraviolet beam.

18. A process according to claim 16 wherein a vulcanizer is added to said organic silazane polymer before irradiation of an ultraviolet beam.

19. A process according to claim 10, wherein said molding process is a spinning process and organic silazane polymer is melted and spun to obtain fibers which are sintered.

20. A process according to claim 10, wherein the sintering is effected at a temperature of from 700° to 2000° C.

21. A process according to claim 10 wherein the sintering is effected in vacuum or in an atmosphere of at least one gas selected from the group consisting of inert gases, $N_2$, $H_2$ and $NH_3$ gases 22. A process according to claim 10, wherein the organic silazane polymer is added to a powder of inorganic compound as a binding agent and sintered.

23. A process according to claim 22, wherein the powder of inorganic compound is at least one material selected from the group consisting of alumina, silicon carbide, silicon nitrate and boron nitride.

* * * * *